United States Patent [19]

Phillot et al.

[11] 4,015,178

[45] Mar. 29, 1977

[54] REFERENCE VALUE TRANSMITTER FOR A PHASE CLIPPING CONTROL FOR STARTING A SQUIRREL CAGE-ASYNCHRONOUS MOTOR

[75] Inventors: Charles Phillot, Aarau; Heinz Unterweger, Buchs, both of Switzerland

[73] Assignee: Sprecher & Schuh AG, Aarau, Switzerland

[22] Filed: June 20, 1975

[21] Appl. No.: 588,958

[30] Foreign Application Priority Data

June 27, 1974 Switzerland .................. 8854/74

[52] U.S. Cl. ........................... 318/227; 318/230; 318/410; 318/414
[51] Int. Cl.² ............................................. H02P 5/40
[58] Field of Search ........... 318/227, 230, 410, 414

[56] References Cited

UNITED STATES PATENTS

| 3,189,810 | 6/1965 | MacGregor | 318/227 |
| 3,573,580 | 4/1971 | Shinozaki | 318/227 |

Primary Examiner—Gene Z. Rubinson

[57] ABSTRACT

A reference value transmitter for a phase clipping or cutting control for starting a squirrel cage-asynchronous motor, comprising a start-up regulator for the upward regulation of a reference value transmitter-output voltage from a start-up voltage value which is constant during a primary start-up phase to a rated voltage value with a predetermined build-up speed during a terminal start-up phase. The start-up regulator is constructed for triggering the terminal start-up phase by means of a command signal and for the start-up regulator there is provided a command transmitter which contains a current measuring device for the motor current and a threshold value or limit indicator connected with the current measuring device for generating the command signal. By means of the threshold value of the threshold value indicator there is determined the intensity of the motor current during the pull-out rotational speed and which motor current amounts to a predetermined fraction of the motor current intensity at the start of the primary start-up phase.

7 Claims, 7 Drawing Figures

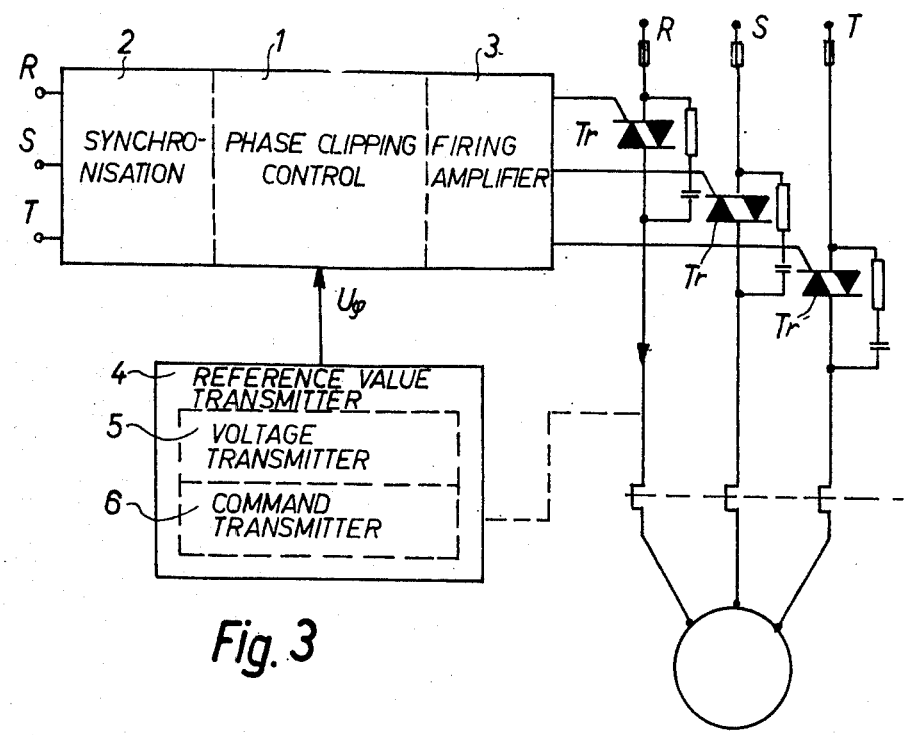
Fig. 3
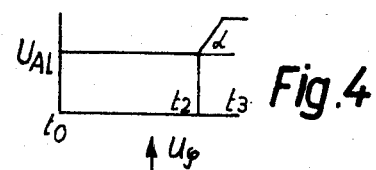
Fig. 4
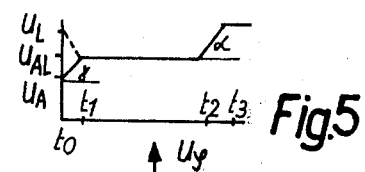
Fig. 5
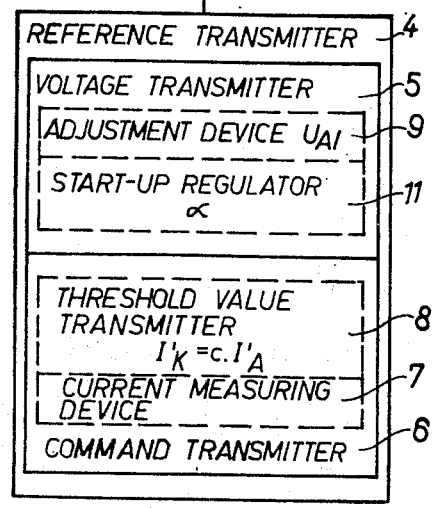
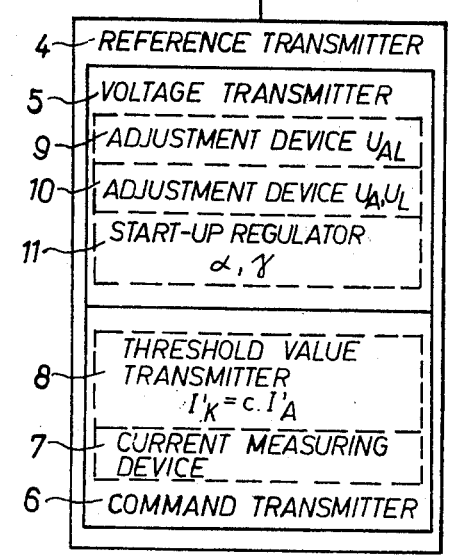

REFERENCE VALUE TRANSMITTER FOR A PHASE CLIPPING CONTROL FOR STARTING A SQUIRREL CAGE-ASYNCHRONOUS MOTOR

BACKGROUND OF THE INVENTION

The present invention relates to a new and improved construction of a reference value transmitter for a phase clipping or phase cutting control for starting a squirrel cage-asynchronous motor, comprising a start-up regulator for the upward regulation of a reference value transmitter-output voltage from a start-up voltage value which is constant during a primary start-up phase to a rated voltage value with a predetermined build-up speed during a terminal start-up phase.

As far as the state-of-the-art starters for squirrel cage-asynchronous motors is concerned the simpliest as concerns expenditure of equipment is the star-delta reversing switch or switching arrangement. The motor is started-up by means of a stator winding which is connected in a star circuit configuration and after reaching the stable rotational speed the stator winding is switched into a delta circuit configuration. In the case of star-connected stator windings the motor torque must be sufficiently above the load torque and switching must not take place prior to termination of the start-up operation. The reduced torque or rotational moment of the motor connected in star circuit configuration, which requires a corresponding counter moment of the driven machine or load, the occurrence of current surges which are damaging to the windings, especially when switching-over from the star circuit configuration to the delta circuit configuration, and the occurrence of torque surges during the switching operation, which can be particularly considerable in the case of operating machines possessing small moment of inertia constitute the essential drawbacks of a star-delta switching arrangement; but in contrast thereto such have the advantage of relatively low equipment expenditure.

There are known to the art a number of further starting techniques for squirrel cage-asynchronous motors, the greatest technological advantages of which are considered to be simultaneous frequency- and voltage regulation. With these techniques there are employed controlled power semi-conductor-switching elements in the motor supply lines and there are used tachodynamos for obtaining signals representing the rotational speed of the motor. Such techniques render possible, in each instance, practically ideal starting-up of the motor, but the expenditure in hardware needed to do so is quite considerable. Less complicated and expensive are phase clipping-contols operating with a fixed frequency of the supply voltage, for instance with current limiting or voltage setting or positioning. With the current limiting technique the motor current, during starting-up of the motor, is maintained constant at a predetermined fraction of the starting current which flows during direct switching-on of the motor. However, at the end of the starting phase the start-up or starting torque steeply increases, leading to a pronounced acceleration which, for some driven machinery, can be impermissibly great. When starting-up a motor while using the voltage setting technique the stator voltage is maintained constant at a start-up voltage value which is below the rated voltage during a primary start-up phase during which the motor should start-up as closely as possible to the rated rotational speed, and then during a terminal start-up phase such stator voltage is upwardly regulated to the rated voltage value. The primary start-up phase and the terminal start-up phase collectively constitute the startup time of the drive system. The start of the build-up or upward regulation, i.e., the start of the terminal start-up phase is thus normally controlled as a function of time. A predetermined time-span is set for the primary start-up phase, and upon expiration thereof there automatically begins the build-up or upward regulation. Consequently, owing to the constant terminal start-up phase there is also fixed the start-up time during which the motor should have reached its rated rotational speed. However, even with proper setting of the time operational disturbances can arise if the operating conditions change during the start-up operation owing to certain factors, such as for instance if the motor is subjected to fluctuating loads, so that the motor starts-up more rapidly or slowly than under normal conditions and, consequently, the upward regulation occurs to early or too late. Because of too early initiation of the build-up or upward regulation there are formed excess currents and pronounced accelerations, and when the build-up or upward regulation occurs too late the motor remains fixed at lower rotational speeds. The reduced expenditure in equipment which is possible in the case of starters with phase clipping or phase cutting control obtained by means of such current limiting or voltage setting is accordingly obtained at the expense of functional drawbacks and also at the expense of a more difficult manipulation or operation of such starter due to errors which easily can arise during the use and operation thereof.

SUMMARY OF THE INVENTION

Hence, it is a primary object of the present invention to provide an improved construction of reference value transmitter for a phase clipping control for starting a squirrel cage-asynchronous motor in a manner which is not associated with the aforementioned drawbacks and limitations of the prior art proposals.

Another and more specific object of the present invention aims at providing a reference value transmitter having a start-up regulator for a phase clipping or cutting control with voltage setting or positioning, which with relatively slight expenditure in equipment overcomes the aforementioned indicated drawbacks of such starters and insures for a positive start-up operation with the most simple manipulation and operation of the equipment.

Now in order to implement these and still further objects of the invention, which will become more readily apparent as the description proceeds, the start-up regulator is constructed to trigger the terminal start-up phase by means of a command signal, a command transmitter is provided for the start-up regulator, this command transmitter containing a current measuring device for the motor and a threshold value indicator operatively connected therewith for generating the command signal. With the threshold or boundary value of the threshold value indicator there can be determined the intensity of the motor current at the pull-out rotational speed, and which motor current intensity amounts to a predetermined fraction of the motor current intensity at the start of the primary start-up phase. Due to triggering of the start-up regulator by the command signal brought about by a motor current measurement and threshold value determination of the motor, even upon reaching the pull-out rotational speed, the build-up or upward regulation automatically occurs always at the proper point in time.

As the current measuring device for the motor current there can be employed a current-voltage converter possessing a rectifier arrangement and as the threshold or boundary value indicator a voltage comparator, at the one input of which there is applied a measurement voltage and at the other input of which there is connected a circuit arrangement for applying a comparison voltage determined by the threshold or boundary value. In order to simplify operation of the equipment, the circuit arrangement can contain a maximum storage at which there is applied the measurement voltage and at which there can be connected through the agency of an impedance converter a voltage divider, the tap of which is connected with the relevant input of the voltage comparator. Further, the voltage divider can be adjusted as a function of the ratio of the motor current at the pull-up rotational speed to the motor current at the start of the primary start-up phase.

The reference value transmitter can be equipped with an adjustment mechanism for adjusting or setting the reference voltage to a starting voltage value which deviates from the start-up voltage value and can contain a regulation device or regulator which is triggered when the equipment is switched-on for leading the output voltage from the starting voltage value to the start-up voltage value during a start-up starting phase preceeding the primary start-up phase in order to obtain a soft or smooth starting-up of the motor with a starting voltage value which is below the start-up voltage value and to obtain a pull-up of the motor corresponding to a prevailing higher break-out moment or torque with a start-up voltage value which is above the starting voltage value. In the command transmitter there can be connected between the current measuring device and the maximum storage a blocking mechanism or device in order to render ineffectual the measurement voltage which is higher during the start-up starting phase in relation to the starting phase.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 schematically illustrates a squirrel cage-asynchronous motor with a starting device containing a phase clipping or cutting control and reference value transmitter for voltage setting or positioning;

FIG. 4 collectively illustrates the components of a reference value transmitter for simple start-up encompassing the primary phase and terminal phase;

FIG. 5 illustrates the components of a reference value transmitter for the gentle start-up and/or higher break-out moment, wherein the start-up occurs in a starting phase, primary phase and terminal phase;

DETAILED DESCRIPTION OF THE PREFERRED EMBODIMENT

Figure 1:
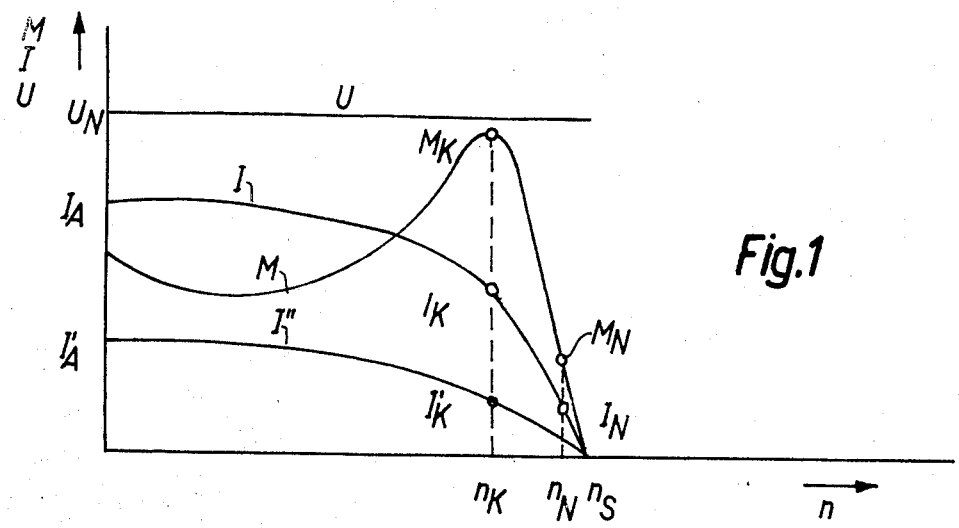
FIG. 1 is a characteristic graph plotting for a squirrel cage-asynchronous motor, the torque, current and voltage as a function of rotational speed.

In the graph of FIG. 1 there are plotted the rotational moment or torque M, the current I and the voltage U of a squirrel cage-asynchronous motor as a function of the rotational speed $n$. Upon turning-on the equipment with the rate voltage $U_N$ and with the motor at standstill the current has its greatest intensity $I_A$. At the rotational speed $n_K$ the motor has reached the pull-out torque $M_K$ and the current intensity $I_K$ has dropped to a predetermined fraction $c$ of the starting current intensity $I_A$, wherein $I_K = c \cdot I_A$. At the rotational speed $n_N$ the motor has reached the rated torque $M_N$ and the current has dropped to the rated current intensity $I_N$. The course of the rotational speed as a function of time is determined by the course of the motor torque and load torque as a function of the rotational speed $n$. The time-span from the moment of switching-in the voltage at the stationary motor until reaching the stable operating rotational speed has been designated by the start-up time $t_A$. With simple starting with voltage setting or positioning there is supplied to the motor a voltage, the course of which as a function of time, has been shown in FIG. 2. The stationary motor is turned-on with a reduced start-up voltage $U_{AL}$ which is constant until the time $t_K$ where there has been reached the pull-out rotational speed $n_K$. This time-span is designated herein as the "primary start-up phase." From the pull-out rotational speed $n_K$ until reaching the rotational speed $n_N$, the "terminal start-up phase", the voltage is built-up or upwardly regulated from the starting or start-up voltage $U_{AL}$ to the rated voltage $U_N$. The current $I'$ decreases proportionally as a function of the reduced start-up voltage $U_{AL} = a \cdot U_N$ and upon reaching the pull-out rotational speed $n_K$ at the point in time $t_K$ the current intensity $I'_K = c \cdot I'_A$, i.e. it has dropped to the predetermined fraction $c$ of its starting or start-up current intensity $I'_A$ at the start of the primary start-up phase (case $a$).

For the smooth or soft starting-up of the motor with appropriate load torque characteristics the motor can be switched-on at a lower starting or start-up voltage $U_A$. During a relatively short "start-up starting phase" (case $b$) the starting or start-up voltage $U_A$ is built-up or upwardly regulated to the starting or start-up voltage $U_{AL}$. At the end of the start-up starting phase at time $t_1$ the current $I'$ has reached the starting or start-up current intensity $I'_A$.

If there is present a higher break-out torque, then, the motor can be turned-on at a higher starting or start-up voltage $U_L$, which is then downwardly regulated to the start-up voltage $U_{AL}$ during the start-up starting phase.

Figure 2:
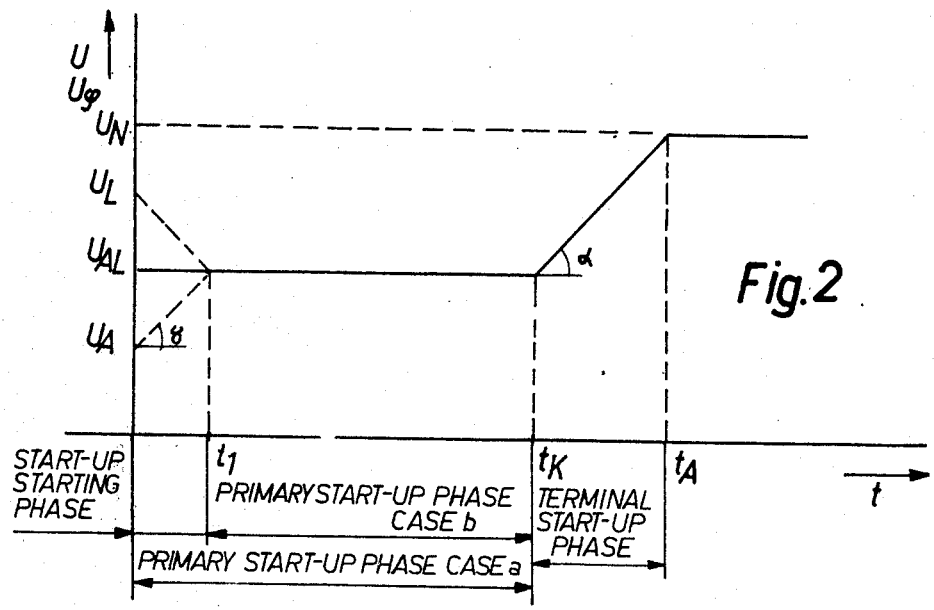
FIG. 2 is a graph showing the time-course of the reference value transmitter voltage $U\varphi$ as the leading magnitude for the motor voltage.

As schematically illustrated in FIG. 3 in each phase line or conductor R, S, T of the squirrel cage-asynchronous motor Mo there is connected in conventional manner a power-semiconductor switching element Tr, for instance a triac. These semiconductor switching elements Tr are turned-on and turned-off by means of a phase clipping or cutting control 1, —forwardly of which there is connected in circuit therewith a synchronization system or device 2,— via an ignition or firing amplifier system 3 in such a manner that upon starting-up of the motor Mo there is applied to the stator winding the voltage U having a time-course function as illustrated in FIG. 2. The reference value transmitter 4 connected with the phase clipping or clipper control 1 delivers thereto a reference voltage $U_\varphi$ which is approximately proportional to the voltage U at the working range of interest and has the same course as a function of time. For the individual voltage values of the reference voltage there are used hereinafter the same reference characters as for the voltage U, to wit: rated voltage value $U_N$, start-up voltage value $U_{AL}$, starting voltage value $U_A$ for soft or smooth starting, start-up voltage value $U_L$ at higher break-out torque. The reference value transmitter 4 encompasses a voltage transmitter portion or component 5 for generating the reference voltage $U_\varphi$ and a command transmitter 6, in response to the commands thereof there is upwardly regulated the reference voltage from the start-up voltage value $U_{Al}$ to the rated voltage value $U_N$. The command for the build-up or upwards regulation at the point in time $t_K$ is triggered by means of a current measurement by determining the pull-out characteristic $I'_K = c \cdot I'_A$. For this purpose the command transmitter 6, according to the circuit diagrams of FIGS. 4 and 5, contains a current measuring device 7 and a threshold or boundary value indicator 8 which delivers the command signal at a current measurement value corresponding to the characteristic $I'_K = c \cdot I'_A$.

For a simple starting-up operation encompassing only the primary start-up phase and the terminal start-up phase (FIG. 2, case $a$), and as best seen by referring to FIG. 4, the voltage transmitter component or portion 5 contains an adjusting or adjustment device 9 for setting or adjusting the output voltage, i.e. the reference voltage to the start-up voltage value $U_{A2}$ and a start-up or build-up regulator 11 responsive to the command signal for the build-up or start-up regulation of the voltage to the rated voltage value $U_N$.

For soft starting-up and starting-up at higher break-out torque, i.e. for a starting-up operation encompassing a starting phase, primary phase and terminal phase (FIG. 2, case b), the voltage transmitter component 5 additionally contains an adjustment mechanism or device 10 for adjusting the reference or set voltage at the starting or start-up voltage value $U_A$ for soft starting-up or the starting or start-up voltage value $U_L$ for higher break-out moment, and further contains either an additional voltage regulation device, which upon turning-on the motor Mo upwardly or downwardly regulates the reference voltage $U_\varphi$ from the adjusted starting voltage value $U_A$ or $U_L$ during the starting phase to the start-up voltage value $U_{AL}$, or the start-up or build-up regulator 11 is constructed such that upon switching-in the reference voltage $U_\varphi$ it upwardly or downwardly regulates the starting voltage value $U_A$ or $U_L$ to the start-up voltage value $U_{AL}$ and then controlled by the command signal upwardly regulates the reference voltage $U_\varphi$ to the rated voltage value $U_N$.

The individual components of the reference value transmitter 4, i.e., the constant voltage transmitter with the adjustment mechanism, the start-up or build-up regulator, the current measuring device and the threshold or boundary value indicator can be randomly or optionally constructed provided only that they fulfill the required functions. With a mechanical constructional embodiment there can be provided a slide-wire potentiometer or variable resistor which is connected at a direct-current power source, the rotor or the like of which is connected with an adjustment motor for displacement by means of a gearing drive and for instance electromagnetic couplings, Such mechanical embodiments however are rather expensive and complicated. For a current measurement with threshold value indication there are likewise known different possibilities. What is advantageous is a current measurement by means of a current converter.

Figure 6:
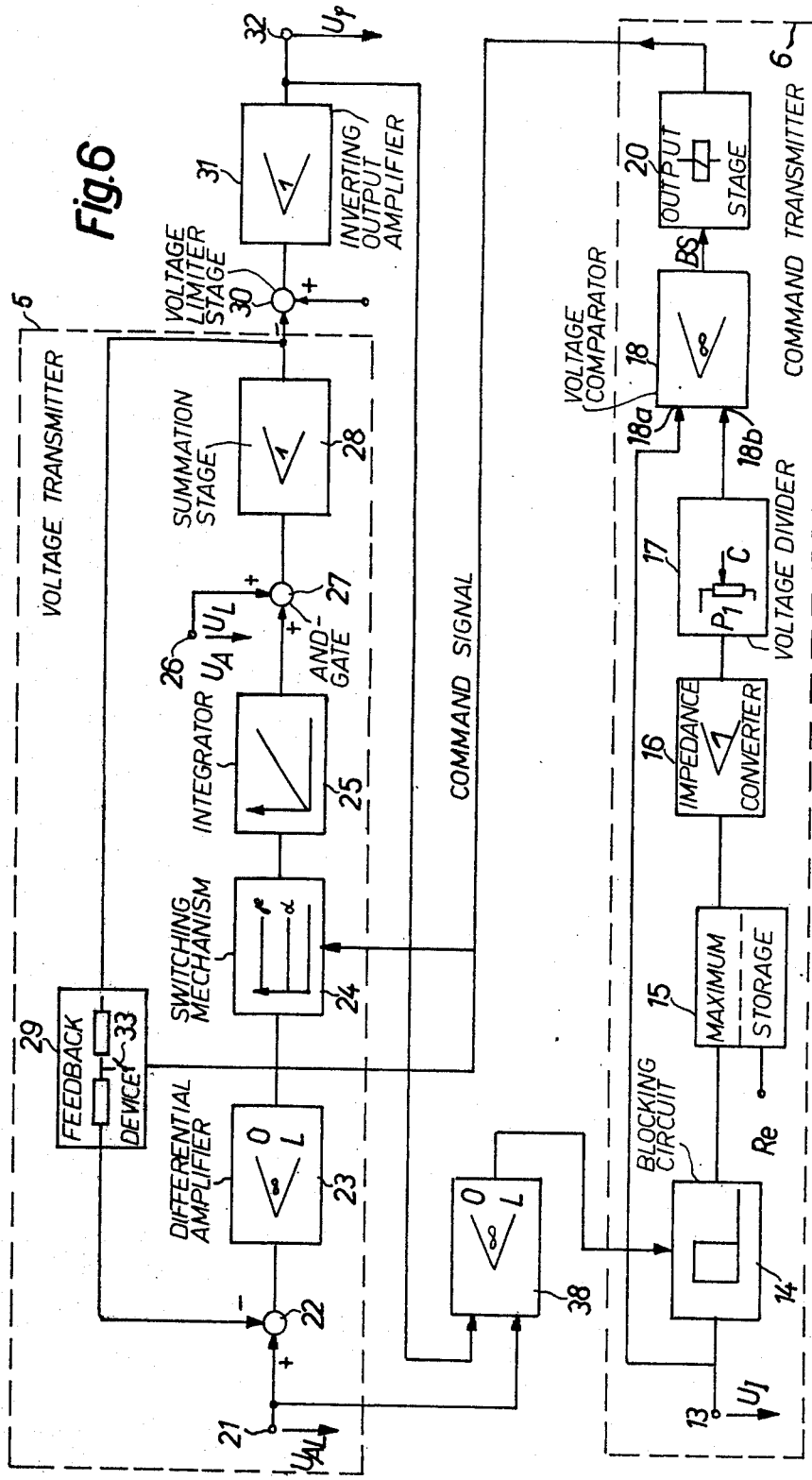
FIG. 6 is a block circuit diagram of a reference value transmitter of the type portrayed in FIG. 5.
Figure 7:
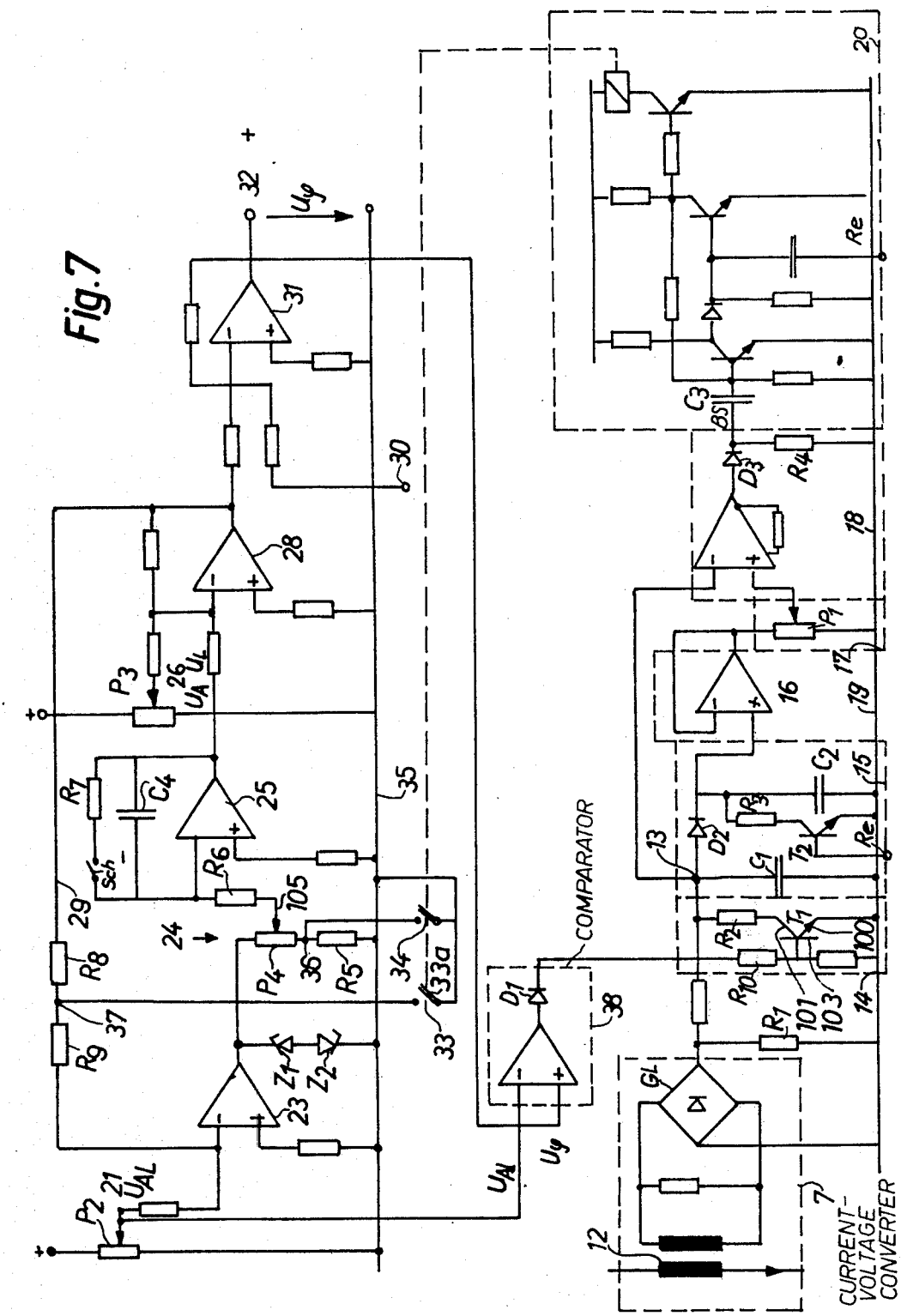
FIG. 7 is a circuit diagram of an advantageous constructional embodiment of the reference value transmitter of FIG. 6.

In FIG. 6 there is illustrated a block circuit diagram of an electronic reference value transmitter for the gentle or smooth starting and the prevailing higher break-out moment, and in FIG. 7 a circuit diagram of a preferred embodiment thereof employing operational amplifiers.

The current measuring device (FIG. 7) comprises a current-voltage converter 7 including a rectifier arrangement G1. The measurement voltage $U_I$ is proportional to the current, for instance, carried by the phase conductor or line R and is tapped-off by a resistor $R_1$ and applied to an input terminal 13 of the command transmitter 6 (FIG. 6). As the threshold or boundary value indicator 8 there is provided in this instance a voltage comparator 18, at the one input 18$a$ of which there is applied the measurement voltage $U_I$ and at the other input 18$b$ of which there is connected a circuit arrangement for generating a comparison voltage for detecting the pull-out characteristic $I'_K = c \cdot I'_A$. The comparison voltage is developed from the measurement voltage $U_I$. The circuit arrangement contains for this purpose a maximum or peak storage 15 which is connected with the input terminal 13 and stores the measurement voltage value which is proportional to the current $I'_A$ at the start of the primary start-up phase. Since in the start-up starting phase with higher break-out torque the cut-on current is greater than the current $I'_A$, the measurement voltage $U_I$ is switched away or blocked from the input of the maximum storage 15 during the start-up starting phase with higher break-out torque by means of the blocking circuit 14. The maximum or peak storage 15 is electrically connected via an impedance converter 16 with a voltage divider 17, for instance a potentiometer $P_1$, the tap of which is adjusted or set in accordance with the aforementioned pull-out characteristic $I'_K = c \cdot I'_A$ for tapping-off the fraction $c$ of the stored maximum or peak measurement voltage value and connected with the comparison voltage input 18$b$ of the comparator 18. When the input voltages are equal then the comparator 18 delivers a command signal which is delivered through the agency of an output stage 20 to the voltage transmitter component or portion 5. With the exemplary embodiment depicted in FIG. 7 the blocking circuit 14 contains a non-transistor $T_1$, the emitter 100 of which is electrically coupled with the reference voltage conductor 19 and the collector 101 of which is electrically coupled via the resistor $R_2$ with the input of the maximum storage 15. The base 103 of the transistor $T_1$ is connected via the diode $D_1$ and the resistor $R_{10}$ with the output of the comparator 38 which compares the reference value-transmitter voltage U and the constant voltage $U_{AL}$ from the tap of the potentiometer $P_2$. In the start-up starting phase with a reference value-transmitter voltage $U_\varphi$ greater than $U_{AL}$ the transistor $T_1$ is conductive. At the maximum storage or store 15 the input terminal 13 is connected via a capacitor $C_1$ with the conductor or line 19 and via a diode $D_2$ with the impedance converter 16 and the storage capacitor $C_2$, the other terminal of which is connected to the ground conductor 19. At the storage capacitor $C_2$ there is connected a discharge path embodying a resistor $R_3$ and the collector-emitter path of a transistor $T_2$, through which the storage capacitor $C_2$, discharges after completion of the starting-up operation, with the transistor $T_2$ being in its conductive state. The output of the comparator 18 is connected via a diode $D_3$ and a resistor $R_4$ with the null or ground conductor 19. In the illustrated exemplary embodiment the command signal BS should energize a relay Rel. The output stage 20 is accordingly a self-holding circuit of conventional design, in the current circuit of which there is connected the relay winding and the input of which is coupled via a coupling capacitor $C_3$ with the output of the comparator 18.

The voltage transmitter component or portion 5 (FIG. 6) possesses an input terminal 21 at which there is applied the start-up voltage $U_{AL}$ by means of a potentiometer $P_2$ serving as the adjustment device or mechanism 9 (FIG. 7). The start-up or build-up regulator 11 consists of an integrator 25, at which there are applied three input voltages, and specifically in the start-up starting phase an input voltage realizing the ascent or rise (FIG. 2), in the primary start-up phase and the input voltage null, and in the terminal start-up phase the input voltage realizing the ascent or slope $\alpha$. The switching from the $\gamma$- input voltage to the $\alpha$- voltage occurs by means of a switching or reversing mechanism 24 responsive to the command signal BS. For generating the input voltage for the integrator 25 there is provided a differential amplifier 23 having practically infinite gain, the output voltage of which during the start-up starting phase and in the terminal start-up phase is controlled either to the positive or negative saturation voltage and in the primary start-up phase approximately assumes a value of null volts, as will be still more fully described hereinafter.

The output voltage of the integrator 25 together with the starting or start-up voltage $U_A$ and $U_L$ which is tapped-off from a terminal 26, and which starting voltage is applied at the terminal 26 by means of a potentiometer $P_3$ serving as the adjustment device or mechanism 10 (FIG. 7) is delivered by means of the AND-logic circuit or gate designated by reference character 27 in FIG. 6 to a summation stage 28. At the input of the differential amplifier 23 there appears the difference of the start-up voltage $U_{AL}$ at the input terminal 21 and the output voltage of the summation stage 21 which is fed back by means of a negative feedback device 29, such differential voltage being indicated by the symbol designated by reference character 22. The summation stage 28 is advantageously an inverting summation-amplifier which, in the presence of a positive input voltage, delivers a negative output voltage which is then inverted by means of an inverting output amplifier 31 into the positive reference voltage $U\varphi$ appearing at its output 32. The feedback device or means 28 is disconnected, by means of the command signal BS owing to the action of the switching or switch means 33 responsive to such command signal, from the input of the differential amplifier 23. With the illustrated exemplary embodiment of FIG. 7 the output voltage of the differential amplifier is limited by the diodes $Z_1$ and $Z_2$ and the switching or reversing mechanism 24 consists of a voltage divider composed of a potentiometer $P_4$ and a resistor $R_5$ which is connected between the output of the differential amplifier 23 and a reference voltage or null conductor 35, and wherein the junction point 36 of the voltage divider is electrically connected through the agency of a relay contact 34 with the null conductor 35. The tap 105 of the potentiometer $P_4$ is connected via a resistor $R_6$ with the input of the integrator 25. The capacitor $C_4$ of the integrator 25 is shunted or bridged by a discharge path comprising the resistor $R_7$ and the switch contact Sch, so that the capacitor $C_4$ is discharged at the end of the starting-up operation by closing the switch or switching contact Sch. The feedback device or means 29 contains both of the resistors $R_8$ and $R_9$, the connection point of junction 37 of which is electrically coupled with the null conductor 35 by means of the switching means 33 formed by a relay contact 33a.

In the rest state the relay contacts 33a, 34 are open. Upon switching-in, and depending upon the starting or startup voltage $U_A$ and $U_L$ set at the potentiometer $P_3$, the output voltage of the summation stage 28 amounts to $-U_A$ or $-U_L$ and the reference or set voltage at the output 32 of the output amplifier 31 amounts to $+U_A$ or $+U_L$. Since the starting voltage $U_A$ and $U_L$ is respectively smaller and greater than the starting voltage $U_{AL}$ set at the potentiometer $P_2$, the output voltage of the differential amplifier 23 possesses negative or positive values respectively. By means of the voltage divider $P_4$, $R_5$ there appears at the integrator input at input voltage corresponding to the slope or ascent $\gamma$ and accordingly the output voltage of the summation stage 28 increases with adjusted starting voltage $U_A$ and decreases with the adjusted or set starting voltage $U_L$. When the sum of the integrator output voltage and the starting voltage $U_A$ or $U_L$, respectively, i.e., the output voltage of the summation stage 28 is absolutely equal to the starting voltage $U_{AL}$ set at the potentiometer $P_2$, then the output voltage of the differential amplifier 23 reaches the value of null volts and the output voltage of the summation stage 28 and the output amplifier 31, respectively, remains at the starting voltage value $-U_{AL}$ or $+U_{AL}$, respectively. With a change of the output voltage of the differential amplifier 23 to the voltage value null there is completed the start-up starting phase and there has begun the primary start-up phase $b$. When the motor has reached the pull-up torque then, as previously described, there is delivered from the command transmitter 6 the command signal BS. The relay Rel (FIG. 7) is energized and the relay contacts 33a and 34 close. Upon closing the relay contact 33a the output of the summation stage 28 is connected via the resistor $R_8$ and the closed relay contact 33a with the nul conductor 35. At the input of the differential amplifier 23 there then appears the complete startup or starting voltage $U_{AL}$ and the output voltage of the differential amplifier 23 attains the negative saturation value. With closed relay contact 34 the resistor $R_5$ of the voltage divider 24 is ineffectual and at the potentiometer $P_4$ there is tapped-off the low input voltage for the integrator 25 corresponding to the slope $\alpha$ in the terminal start-up phase. The output voltages of the summation stage 28 and the output amplifier 31 begin to increase, just as in the terminal start-up phase. The integrator 25 is saturated at the rated voltage value $U_N$. If the integrator- output voltage has risen to this value, then there is also completed the terminal start-up phase.

With the illustrated reference value transmitter there is connected between the summation stage 28 and the output amplifier 31 (FIG. 6) a voltage limiter stage 30, so that the input voltage of the output amplifier 31 is not able to ascend beyond a predetermined value. Since the current is proportional to the reference or set voltage and thus is proportional via the output amplifier 31 to its input voltage it is possible by means of this limiter stage 30 to set a maximum current intensity for the motor which is not exceeded during the starting-up operation so that in a simple manner there is obtained an additional safety or security measure.

The reference value transmitter also can be used for simple starting-up with only primary- and terminal phase. To that end it is only necessary to apply to the terminal 26, instead of the starting or start-up voltage $U_A$ the starting voltage $U_{AL}$, i.e. to connect the terminal 26 with the input terminal 21. Instead of such, it is also possible to of course use as simplified reference value transmitter which in the voltage transmitter portion only contains the summation stage 28 and the integrator 25, and the input voltage of the integrator 25 is switched from null to the input voltage value determining the slope $\alpha$ by mens of the switching means responsive to the command signal BS upon receipt of such command signal.

While there is shown and described present preferred embodiments of the invention, it is to be understood that the invention is not limited thereto, but may be otherwise variously embodied and practiced within the scope of the following claims.

What is claimed is:

1. A reference value transmitter for a phase clipping control for starting a squirrel cage-asynchronous motor comprising start-up regulator means for the upward regulation of a reference value transmitter-output voltage from a start-up voltage value which is constant during a primary start-up phase to a rated voltage value having a predetermined build-up speed during a terminal start-up phase, a command transmitter for delivering a command signal to the start-up regulator means, an adjustment mechanism for adjusting a reference voltage value which deviates from the start-up voltage value, a regulation device triggered upon switching-on the reference value transmitter for leading the reference voltage from the starting voltage value to the start-up voltage value during a start-up starting phase with predetermined lead speed and which start-up starting phase precedes the primary start-up phase, said start-up regulator means containing means for triggering the terminal start-up phase by the command signal, said command transmitter incorporating a current measuring device for the motor current and a threshold value indicator connected with the current measuring device for generating the command signal, said current measuring device including a current voltage converter equipped with rectifier means, said threshold value indicator including a voltage comparator having a first input and a second input; means for applying a measurement voltage to the first input of the voltage comparator, and a circuit arrangement connected with the second input of the voltage comparator for applying thereto a comparison voltage determining the threshold value, and wherein by means of the threshold value of the threshold value indicator there is detected the intensity of the motor current intensity amounts to a predetermined fraction of the motor current intensity at the start of the primary start-up phase.

2. The reference value transmitter as defined in claim 1, wherein said circuit arrangement for applying the comparison voltage to the voltage comparator comprises a maximum storage at which there is applied the measurement voltage, an impedance converter and a voltage divider, the maximum storage being electrically connected via the impedance converter with the voltage divider, said voltage divider having a tap connected with a comparison voltage input of the voltage comparator, said voltage divider being set in accordance with the relationship of the motor current at the pull-up rotational speed to the motor current at the beginning of the primary start-up phase.

3. The reference value transmitter as defined in claim 2, further including an adjustment mechanism for adjusting a reference voltage to a starting voltage value which deviates from a start-up voltage value, a regulation device triggered upon switching-on the reference value transmitter for leading the reference voltage from the starting voltage value to the start-up voltage value during a start-up starting phase with predetermined lead speed and which start-up starting phase precedes the primary start-up phase, and a circuit arrangement for blocking in the command transmitter from the maximum storage the measurement voltage of the current measuring device during the start-up starting phase when the reference value transmitter voltage becomes greater than the start-up voltage value.

4. The reference value transmitter as defined in claim 1, wherein the start-up regulator means comprises an integrator which is saturated at the rated voltage value, said integrator having an input, a switching mechanism connected with said input, said switching mechanism being triggered by means of the command signal for applying at the input of the integrator during the terminal start-up phase an input voltage determining the speed of ascent of the reference voltage, and a summation stage in circuit with the integrator for the summation of the start-up voltage and the integrator-output voltage during the terminal start-up phase.

5. The reference value transmitter as defined in claim 4, wherein the integrator has an output connected with the input of the summation stage, and an adjustment mechanism for adjusting the start-up voltage value comprising a center tap of a voltage divider connected with the input of the summation stage.

6. The reference value transmitter as defined in claim 4, wherein the summation stage has an input at which there is applied the output voltage of the integrator and by means of a first voltage divider the start-up voltage, feedback means, a differential amplifier for generating the input voltage for the integrator, said differential amplifier having an input at which there is applied the difference of the start-up voltage set at a second voltage divider and the output voltage of the summation stage which is fed back by means of said feedback means, the differential amplifier being constructed to deliver a positive or negative saturation voltage when the input voltage is not equal to null during the start-up starting phase and the terminal start-up phase and a voltage equal to null when the input voltage equals null during the primary start-up phase, said differential amplifier having an output connected with a third voltage divider for tapping-off the integrator-input voltage, and switching means actuated by the command signal, said switching means disconnecting the feedback means from the input of the differential amplifier and the third voltage divider by shunting a partial resistor upon tapping-off a higher input voltage value for the integrator.

7. The reference value transmitter as defined in claim 1, further including an output amplifier electrically connected with the summation stage, said output amplifier delivering a reference voltage, a voltage limiter connected in circuit between the output amplifier and the summation stage for limiting the input voltage of the output amplifier to a maximum value.

* * * * *